June 23, 1964     T. R. MURRAY ETAL     3,138,536

FUEL FOLLOWER FOR A REACTOR CONTROL ROD

Filed Sept. 6, 1960     3 Sheets-Sheet 1

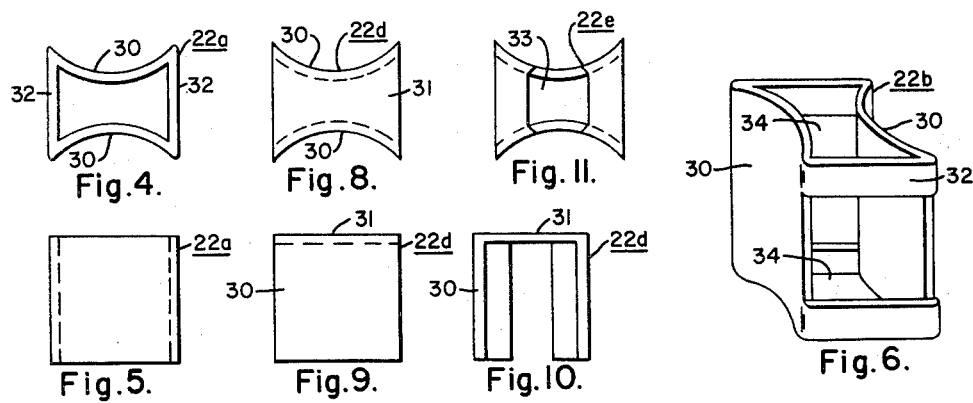
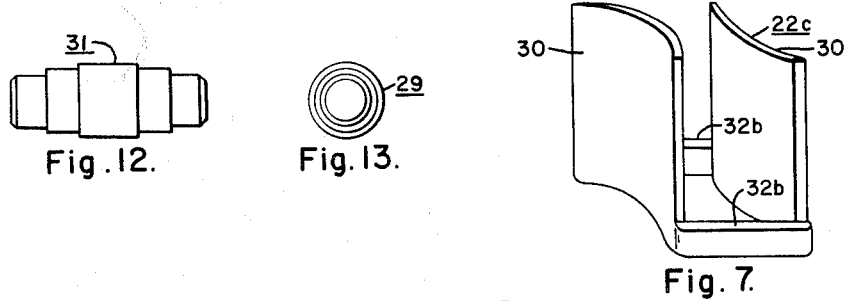
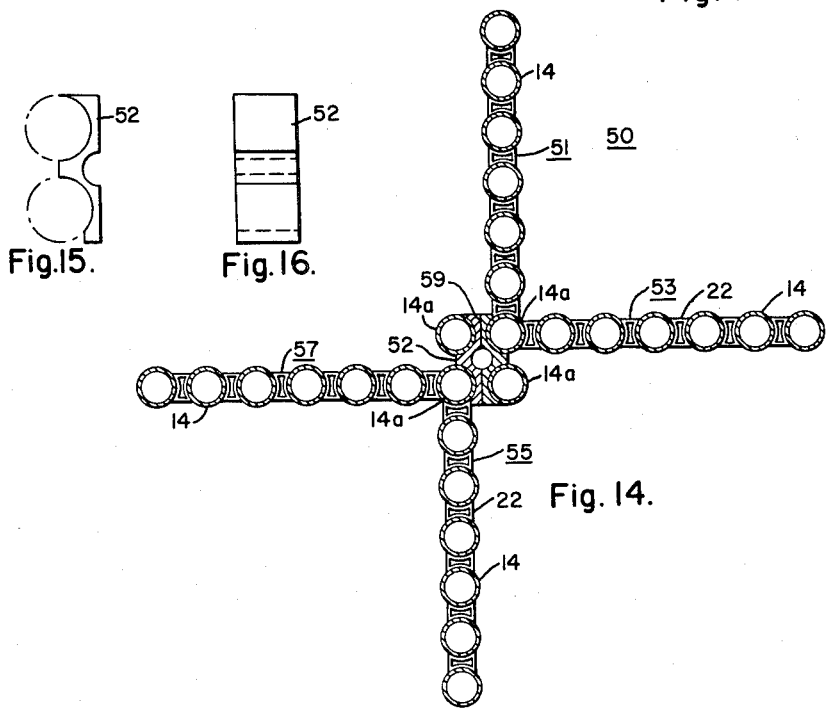

United States Patent Office 3,138,536
Patented June 23, 1964

3,138,536
FUEL FOLLOWER FOR A REACTOR
CONTROL ROD
Thomas R. Murray, Pittsburgh, Harry N. Andrews, Monroeville, and Walter W. Fahrion, Irwin, Pa., assignors to Westinghouse Electric Corporation, East Pittsburgh, Pa., a corporation of Pennsylvania
Filed Sept. 6, 1960, Ser. No. 54,226
6 Claims. (Cl. 176—40)

The present invention relates to heterogeneous fuel arrangements for nuclear reactors and more particularly to such arrangements in which movably positioned control rods are provided with a follower device for inhibiting flux peaking ordinarily associated with withdrawal movement of the rods.

In a heterogeneous nuclear reactor, a plurality of elongated fuel elements are usually arranged in the form of an array or an assembly, with elongated channels being provided for longitudinal movement of neutron absorbing rods in controlling or in discontinuing an existing nuclear chain reaction. Channels are also provided for circulating a cooling fluid, at an adequate rate of flow, along the various fuel elements for extracting generated energy for external use.

The cooling fluid or coolant generally is free to enter that portion of each control rod channel which is unoccupied by the control rods. This being the case, withdrawal of the control rods leads to an entry of a supplanting quantity of the coolant into the control rod channels to occupy the resulting vacancy unless steps are taken to avoid this effect. Whether such an effect is undesirable and is therefore to be avoided depends to a large extent upon the moderating capacity of the coolant, for any perturbation or peaking in fission-producing neutron flux in the vicinity of the space vacated by the control rods is a function of the moderating effect of the coolant in slowing fast neutrons to lower energy levels, for example thermal energy levels where neutrons of such energy levels are being employed to propagate the nuclear chain reaction.

As an elementary matter, peaking of the neutron flux leads to a greater localized rate of reactivity and a consequent temperature rise in the surrounding structural and other reactor materials. Such rises in temperature result in "hot spots" which can lead to damaging effects and are therefore desirably to be eliminated. In this connection, a follower device can be attached to the inner end of each control rod to follow the withdrawal movement of the rods and thereby occupy, at least partially, the space vacated by the rods. If the moderating capacity and the coolant displacement function of the followers are properly correlated, any resulting perturbation or peaking of neutron flux can clearly be minimized or avoided.

If the follower itself is provided with fuel bearing material, not only may the objectionable effects already outlined be avoided, particularly if a proper geometry is provided for the fuel, but an increase in generated power can be obtained as well. For reasons which will subsequently become more apparent, both uniform fuel distribution across the fuel assembly and non-interference with control rod movement are to be considered as functional guide posts in providing a fuel follower for a control rod.

Thus, it is an object of the invention to provide a novel fuel bearing follower for a control rod in a nuclear reactor so as to increase the energy output of the reactor.

It is another object of the invention to provide a novel fuel bearing follower for a control rod in a nuclear reactor so as to minimize or avoid flux perturbations upon withdrawal of the control rod.

A further object of the invention is to provide a novel fuel bearing follower for a control rod in a nuclear reactor providing uniformity in fuel distribution across the reactor upon withdrawal movement of the control rod so as both to minimize or avoid flux perturbations and so as to increase the energy output of the reactor.

It is an additional object of the invention to provide a novel follower for a control rod in a nuclear reactor so as to obtain any or all of the preceding objects and so as substantially to preclude the resulting control rod assembly from being jammed against movement notwithstanding the presence of mechanical or thermal or other forces which might otherwise cause a jamming effects to occur.

Another object of the invention is to provide a novel fuel follower comprising a plurality of elongated fuel elements with means including a plurality of ferrules being provided for supporting these elements relative to the control rod and relative to each other so as to enable the elements to be restrained from lateral deformation with a minimum of force and to deform longitudinally in response to thermal or other forces.

These and other objects of the invention will become more apparent upon consideration of the following detailed description of the invention along with the attached drawings, in which:

FIG. 4 is an enlarged top plan view of one species of a structural element or a ferrule for use in contributing to the support of various fuel elements of the follower of FIG. 1;

FIG. 5 is an elevational view of the ferrule shown in FIG. 4;

FIG. 6 is an enlarged isometric view of one modification of the ferrule shown in FIG. 4;

FIG. 7 is an enlarged isometric view of another modification of the ferrule shown in FIG. 4;

FIG. 8 is an enlarged top plan view of another ferrule for the purposes described in connection with FIG. 4;

FIG. 9 is an elevational view of the ferrule shown in FIG. 8;

FIG. 10 is an end view of the ferrule shown in FIG. 8;

FIG. 11 is an enlarged top plan view of a modification of the ferrule shown in FIG. 8;

FIG. 12 is an enlarged side elevational view of a plug member which is included as a part of the fuel elements of FIGS. 1 and 2;

FIG. 13 is a top plan view of the plug member of FIG. 12;

FIG. 14 is a cross-sectioned view similar to the view of FIG. 3 but of a fuel follower which is formed slightly differently from the fuel follower of FIG. 3;

FIG. 15 is an enlarged partial view of the fuel follower of FIG. 14 showing in detail a tie member for use therewith; and FIG. 16 is a side view of the tie member shown in FIG. 15.

Figure 1:
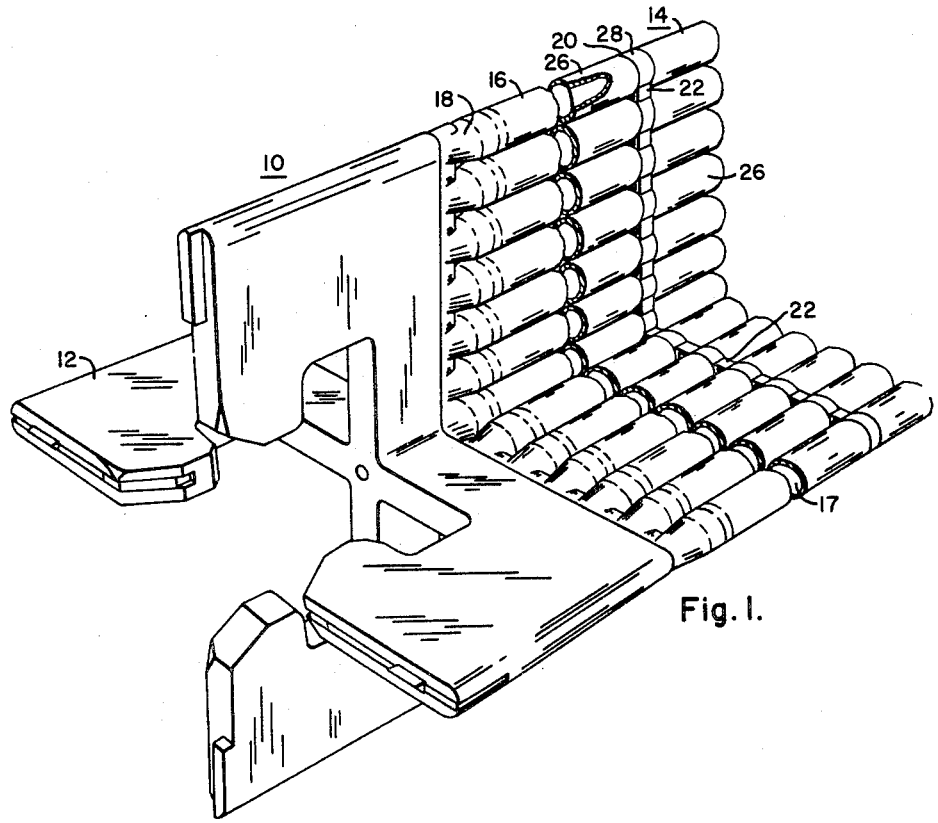
FIGURE 1 is a partial perspective view of a fuel follower fabricated in accordance with the principles of the invention.
Figure 2:
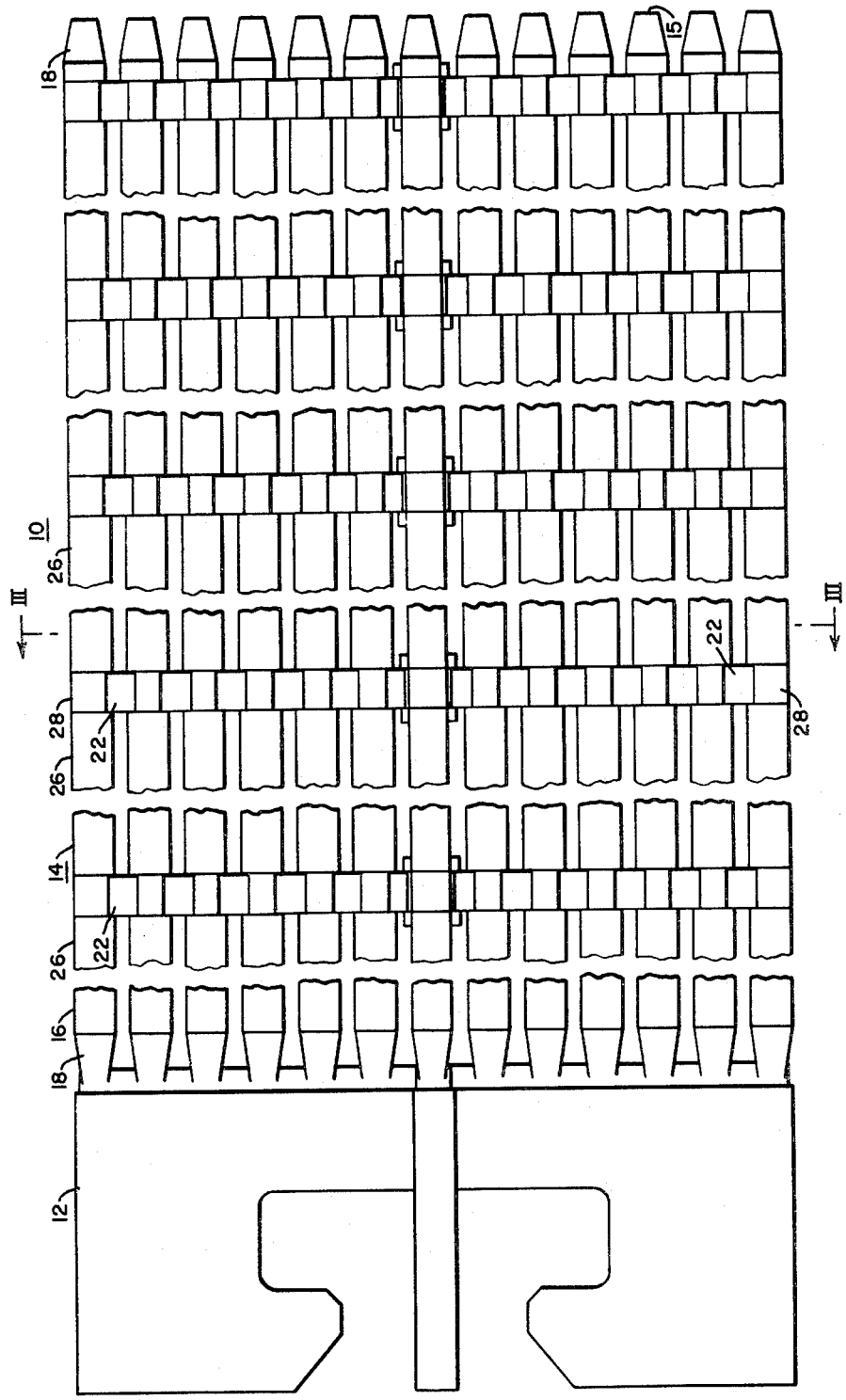
FIG. 2 is an enlarged, elevational view, with portions being removed, of the fuel follower of FIG. 1.

With reference to FIGS. 1 and 2, a fuel follower 10 is provided for use in a heterogeneous fuel arrangement or core (not shown) of a nuclear reactor (not shown). For example, the follower 10 can be secured to a control rod for use in conjunction with a group of elongated fuel assemblies comprising an array of elongated fuel elements, such as that described in a copending application of R. J. Creagan, filed September 27, 1957, Serial No. 686,778, now abandoned, entitled "Neutronic Reactor," and assigned to the present assignee. Means including a latching member 12, of a suitable structural material such as stainless steel, are provided for securing the follower 10 in aligned relation with an elongated control rod which is supported for longitudinal movement along a channel in the employed fuel assembly. For a full description of the securing means just noted, reference is to be made to a copending application of E. Frisch and C. G. Johnson, filed July 22, 1957, Serial No. 673,533, now U.S. Patent No. 3,034,814 entitled "Coupling," and assigned to the present assignee.

Design considerations are determinative of the lateral outer contour or envelope of each control rod associated with the fuel assembly and, accordingly, the inner envelope of each control rod channel in the fuel assembly. In this example of the invention, the follower 10 is gnerally provided with a cruciform lateral envelope for conformity in use with a cruciform control rod comprising elongated, laterally intersecting plates of neutron absorbing material, such as an alloy of hafnium and cadmium. It is desirable that the control rod outer envelope generally conform in outline with the rod channel inner envelope and that the former be only marginally smaller in size than the latter. In such a case, the fuel inventory for criticality and for the desired operational power level can be relatively minimized for reasons including the fact that flux peaking is then generally inhibited and the fact that the fuel elements can then be distributed uniformly in close relation.

Where the dimensional parameters of the control rod and its follower are as critical as those just described, any lateral or bowing deformation of a control rod or its follower might jam one or the other of these members against adjacent structure of the fuel assembly, for example adjacent fuel assemblies. Such a result could lead to substantial damage, particularly if a full insertion or a "scram" of all the control rods is demanded by emergent circumstances. It is, therefore, essential that lateral deformation of each of the control rods and the followers be substantially precluded. It is to be noted that the inherent strength provided by the structural form of the cruciform control rod being exemplarily considered here contributes toward this end.

To obtain the objective of uniform distribution of the fuel inventory so as generally to inhibit or avoid flux peaking effects, a fuel follower for a control rod should provide a cross sectional distribution of fuel equivalent to the cross sectional distribution of fuel elsewhere in the aforementioned reactor core. Thus, the space vacated by withdrawal movement of the control rod can then be occupied by the fuel follower to provide uniformity in the distribution of the fuel inventory as taken cross-sectionally through the follower. It is, therefore, possible to minimize or avoid flux control channel peaking, which exists, perhaps most pronouncedly, where no follower is employed and which exists probably to a lesser degree where an employed follower bears no fuel or where an employed fuel follower is provided with a cross sectional form introducing a non-conforming fuel distribution.

In this embodiment of the invention, the follower latching member 12 is generally of cruciform outline for conformity with the aforementioned cruciform control rod being considered here and the cruciform control rod channels provided therefor and extending in generally parallel directions among adjacent fuel assemblies of the core, as described in the application of R. J. Creagan. To avoid flux peaking in this example of the invention and to provide for uniformity of the fuel inventory where a plurality of elongated, in this instance tubular, fuel elements form the aforementioned fuel assemblies or reactor core, means are provided for supporting in spaced relation a plurality of elongated fuel rods 14 relative to the latching member 12 and relative to each other. Of course, the lateral envelope of the fuel rods 14 is generally of the cruciform type for conformity with the latching member 12, and the spacing between the fuel rods 14 provides for proper circulation of the coolant. Generally, each rod 14 comprises a tubular cladding member 16 of a suitable material such as stainless steel, with fissionable material, for example uranium dioxide enriched if desired with $U^{235}$, being placed, preferably in the form of pellets 17, within the cladding member 16. Further description of the fuel rods 14 will be presented subsequently.

As part of the aforementioned supporting means, the latching member 12 can be provided with recesses (not shown) into which an end plug 18 of the respectively adjacent fuel rods 14 can be inserted and secured by any suitable means, such as by welding or with the use of supporting pins. Considering operative movement of the follower 10 to be in the vertical direction, it is clear that without additional support the rods 14, as thus far described, are suspended from the latching member 12 without being retained against lateral deformation or movement.

Figure 3:
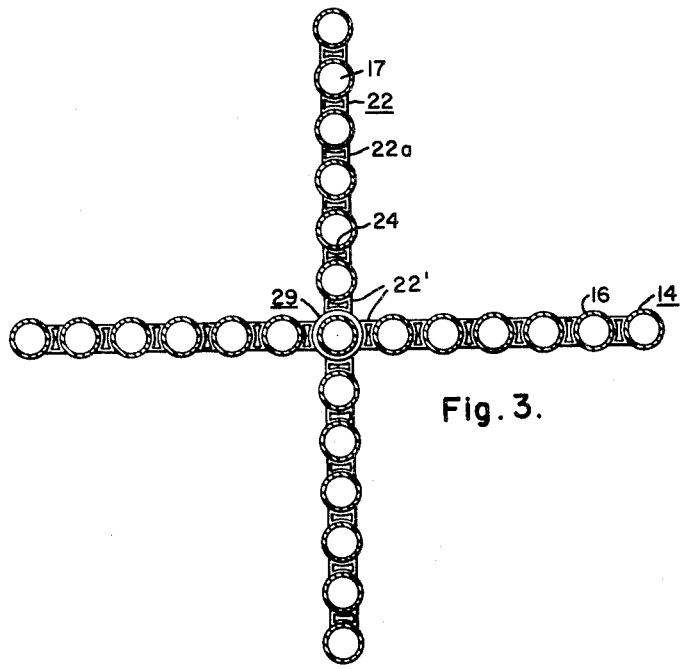
FIG. 3 is a cross-sectioned view of the fuel follower shown in FIGS. 1 and 2 and taken along reference line III—III of FIG. 2.

To hold the rods 14 against this lateral movement while avoiding the objectionable jamming effects already considered as ordinarily resulting from overall lateral or bowing deformation of a control rod follower, the aforementioned supporting means also include a plurality of securing members arranged in transverse rows 20 of ferrules 22 falling within the cruciform contour of the fuel rods 14 and being secured between adjacent fuel rods 14 by any suitable means, such as by brazing as indicated in FIG. 3 by the reference character 24. A suitable fixture can be utilized for holding the fuel rods 14 relative to each other during the brazing operation if this operation is employed.

The cladding member 16 of the fuel rods 14 can, as in this example, be divided into a plurality of segments 26, with adjacent segments 26 being joined, as by welding, through a plug 28 or 29 to which the ferrules 22 are secured (24). In this manner, the probability of jamming of the fuel pellets 17 within the cladding member 16 is relatively minimized since the full column of pellets 17 is then divided into shorter columns in tandem relation with the plugs 28 or 29, and the securing of the ferrules 22 to the fuel rods 14 can be accomplished generally without leading to damage of the cladding member 16. Of course, each fuel rod 14 is provided with a plug 28 or 29 in each row 20 of ferrules 22. In the case of each of the plugs 29, a laterally extended annular portion 31 (FIG. 12) is provided for securance with adjacent ferrules 22. Generally, lateral space exists for this purpose within the allotted cruciform contour of this example, and by taking advantage of this fact some additional structural strength is provided. In some applications, ferrules 22' which are innermost and adjacent to the plugs 29 might have to be sized differently from the ferrules 22 so as to accommodate each plug portion 31.

If desired, a hole can be extended axially through each plug 28 or 29 for the purpose of equalizing fission gas pressure among the various segments 26 of each fuel rod 14. As another notable point, the plugs 28 and 29, of a material such as stainless steel, generally strengthen the fuel rods 14. Where the wear of the fuel rods 14 during operation of the follower 10 is expected to be significant enough for consideration, the cladding member 16 can be provided with added thickness as an offsetting measure.

The spacing of the rows 20 of the ferrules 22 will be determined by the overall length of the fuel rods 14 and by the desired rigidity for the follower 10. As will be indicated hereafter in greater detail, the ferrules 22 can be provided in various forms to provide varying degrees of rigidity or stiffness for the follower 10.

For one example, the ferrules 22 can be provided with the form as indicated by the reference character 22a shown in FIG. 3 and with enlarged detail in FIGS. 4 and 5. The ferrule 22a can be formed by ordinary techniques from a short tubular piece of material, such as stainless steel, and is provided with arcuate walls 30 for securance to adjacent fuel rods 14 and with connecting walls 32 extending between the sides or ends of the arcuate walls 30. The following is presented as an example of the rigidity which can be obtained for the follower 10 with the use of the ferrule 22a:

| | |
|---|---|
| Material | No. 304 Stainless Steel. |
| Thickness | 20 mils. |
| Length | 500 mils. |
| Height | 187 mils. |
| Width | 350 mils. |
| Radius of arcuate walls | 30–220 mils. |

Using a plurality of ferrules 22a, three fuel rods 14 were joined by brazing. This subassembly was mounted in a testing machine and the ferrules 22a were found to be capable of withstanding a load of 1100 pounds, applied against one of the fuel rods 14 generally in a plane perpendicular to a reference cross-sectional plane through one of the ferrules 22a, prior to buckling of the ferrule walls 30 and 32 under shear stress.

Another ferrule 22b, which is a modification of the ferrule 22a, is shown in FIG. 6. Portions 34 of the connecting walls 32 are removed to provide less section modulus against shear and therefore less restraint against axial movement of adjacent fuel rods 14 relative to each other. In FIG. 7, another ferrule 22c is shown with strips 32b being provided to connect the arcuate walls 30. The ferrule 22c of course, leads to axial flexibility of the fuel rods 14 as in the case of the ferrule 22b but in a greater degree.

In FIGS. 8 through 10, another ferrule 22d is provided, with the arcuate walls 30 having a flat strip 31 extending therebetween. Since the cross section of the strip 31 can be formed to be of relatively small size and therefore of small section modulus against shearing forces, considerable flexibility is provided for axial movement of adjacent fuel rods 14 relative to each other. FIG. 11 shows another ferrule 22e having a portion 33 of the strip 31 removed to provide even a greater degree of axial flexibility than that provided by the ferrule 22c.

As previously noted, to preclude jamming of a follower and its adjoining control rod, bowing or lateral deformation of each of these members must be eliminated substantially altogether or, if not eliminated, then the forces necessary to restrain such deformation, or to restore substantially normal form to the laterally or bowingly deformed member, must be relatively minimized. In the latter two instances, jamming effects are avoided for reasons including the fact that frictional or drag forces against control rod movement are then tolerably valued. For notation purposes, bowing or lateral deformation of a follower can be caused by various forces including thermal forces generated as a result of a temperature differential existing across the follower. Such a temperature differential can arise, and ordinarily would arise in most reactors, as a result of either a uniform or a non-uniform gradient of neutron flux across the follower.

In the instance of the fuel follower 10, lateral or bowing deformation is not entirely precluded because each of the fuel rods 14 is not absolutely free to undertake differential axial expansion independently of the other fuel rods 14. For example, where axially directed thermal forces are applied to the fuel rods 14 differentially across the follower 10, a bowing moment is resultingly applied to the follower 10 and some bowing occurs since the ferrules 22 tensionally oppose, in varying degrees according to the species which is employed, free axial expansion of the fuel rods 14, particularly those rods 14 subjected to greater axial forces.

It is significant, on the other hand, that only relatively minimal external forces, again in varying degrees according to the employed species of the ferrules 22, are required to restore the follower 10 to substantially normal form or to restrain the follower 10 from bowing or deforming laterally in the first place. In an operating reactor, such forces might originate, as an example, in the structural material surrounding the control rod channel in which the follower 10 is located. Since the ferrules 22 have a relatively low section modulus against shearing forces in the longitudinal direction of the follower 10, again varying in degree according to the employed species, shearing components of the examplified external forces would cause the ferrules 22 to bend or buckle as required to enable the various fuel rods 14 to elongate in preference to bowing. Since a remote end 15 (FIG. 2) of each rod 14 is free, such elongation is not otherwise prevented. It follows, therefore, that the means for supporting the follower rods 14, which bear fuel in this example, substantially preclude the rods 14 from jamming and, therefore, from interfering with freedom of control rod movement since the relatively minimal restoring or restraining forces applied to the follower 10 will be operative, at worst, only to induce a relatively minimal frictional effect upon control rod movement.

An alternate fuel follower 50, in FIG. 14, is provided for another form of control rod which has a cross section generally of the cruciform type but which has its opposed arms laterally offset from each other. Where it is desired to form or braze follower arms 51 and 53 as a unit for attachment to follower arms 55 and 57 as a unit, a plurality of specially formed tie members 52 can be provided for securing centrally located fuel rods 14a relative to each other. Thus, in each row 20, a tie member 52 is brazed or secured to the rods 14a of the arm 51 and another tie member 52 is brazed or secured to the rods 14a of the arm 55 and opposite tie members 52 are then secured together, as by welding as indicated by the reference character 59, so as to provide the arms 51, 53, 55 and 57 as a unit. Where it is desired to form or braze the arms 51, 53, 55 and 57 unitarily in the first place, the ferrules 22 can be employed. As an added notation, the structural properties described in connection with the ferrules 22 can, if desired, be equivalently provided in the tie members 52. With the use of the added fuel rods 14a centrally of the follower 50, additional strength is provided against bowing or lateral deformation.

In the foregoing description, several physical arrangements have been described in detail to point out the principles of the invention. The description, however, is only illustrative of the invention, and, accordingly, it is desired that the invention be not limited by the embodiments described here but, rather, that it be accorded an interpretation consistent with the scope and spirit of its broad principles.

What is claimed is:

1. In a nuclear reactor, a follower for an elongated control rod employed therein, said follower comprising a plurality of elongated fuel rods forming a lateral envelope substantially conforming to that of said control rod, means for supporting said fuel rods relative to said control rod and relative to each other, said supporting means including a plurality of ferrules, each of said ferrules having opposed arcuate walls matingly secured to adjacent fuel rods, a portion of each of said ferrules joining said arcuate walls and having a cross section so sized as to enable a measure of differential longitudinal deformation of said fuel rods to be obtained to preclude said follower from jamming against adjacent structure.

2. In a nuclear reactor, a follower for an elongated control rod employed therein, said follower comprising a plurality of elongated fuel rods forming a lateral cruciform envelope substantially conforming to that of said control rod, means for supporting said fuel rods relative to said control rod and relative to each other, said supporting means including a plurality of ferrules, each of said ferrules having opposed arcuate walls matingly secured to adjacent fuel rods, each of the arms of the cruciform envelope including a single row of fuel rods and said ferrules being within said cruciform envelope.

3. In a nuclear reactor, a follower for an elongated control rod employed therein, said follower comprising a plurality of elongated fuel rods forming a lateral envelope substantially conforming to that of said control rod, means for supporting said fuel rods relative to said control rod and relative to each other, said supporting means including a plurality of ferrules, each of said ferrules having opposed arcuate walls matingly secured to adjacent fuel rods, portions of each of said ferrules joining the sides of one arcuate wall which extends longitudinally of said fuel tubes to the opposed sides of the other arcuate wall, the cross section of said portions being so sized as to enable a measure of differential longitudinal deformation of said fuel rods to be obtained to preclude said follower from jamming against adjacent structure.

4. In a nuclear reactor, a follower for an elongated control rod employed therein, said follower comprising a plurality of elongated fuel rods forming a lateral envelope substantially conforming to that of said control rod, means for supporting said fuel rods relative to said control rod and relative to each other, said supporting means including a plurality of ferrules, each of said ferrules having opposed arcuate walls matingly secured to adjacent fuel rods, a portion of each of said ferrules joining at least one side of one arcuate wall which extends laterally of said fuel rods to the opposed one side of the other arcuate wall, the cross section of said portion being so sized as to enable differential longitudinal deformation of said fuel rods to be obtained to preclude said follower from jamming against adjacent structure.

5. In a nuclear reactor, a follower for an elongated control rod employed therein, said follower comprising a plurality of elongated fuel rods forming a lateral envelope substantially conforming to that of said control rods, means for supporting said fuel rods relative to said control rod and relative to each other, each of said fuel rods comprising a plurality of cladding segments and a plurality of plugs in alternating tandem relation, and said supporting means including a plurality of ferrules laterally joined together the plugs of adjacent fuel rods.

6. In a nuclear reactor, a follower for an elongated control rod employed therein, said follower comprising a plurality of elongated fuel rods forming a lateral envelope substantially conforming to that of said control rod, means for supporting said fuel rods relative to said control rod and relative to each other, each of said fuel rods comprising a plurality of cladding segments and a plurality of plugs in alternating tandem relation, and said supporting means including a plurality of ferrules laterally joining together the plugs of adjacent fuel rods, each of the plugs provided for a centrally located one of said fuel rods having a laterally enlarged annular portion to which adjacent ferrules are joined.

No references cited.